Patented Feb. 15, 1938

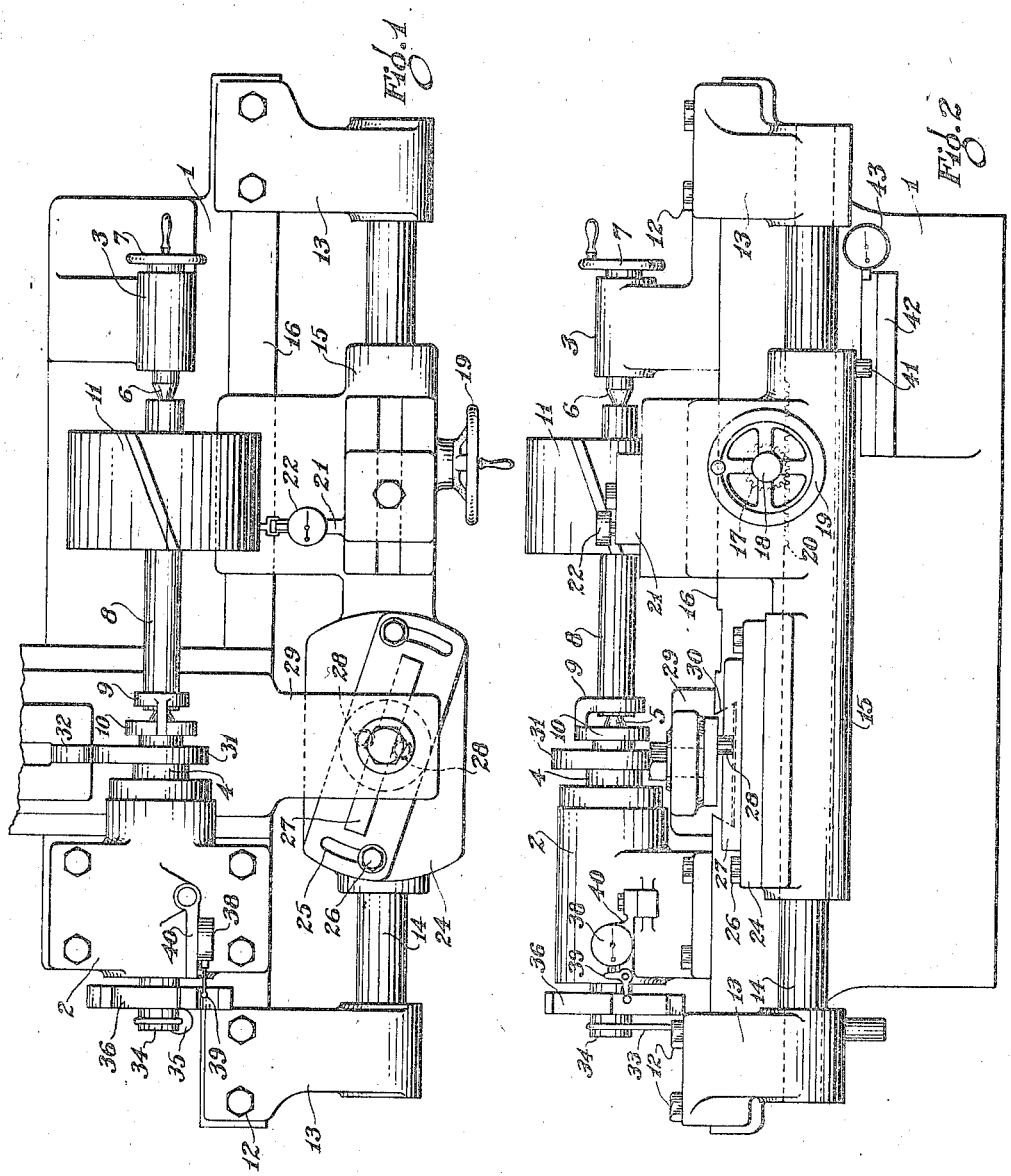

2,108,414

UNITED STATES PATENT OFFICE 2,108,414

MEASURING APPARATUS

Charles H. Schurr, Cleveland, Ohio, assignor to The Lees-Bradner Company, Cleveland, Ohio, a corporation of Ohio Application May 21, 1932, Serial No. 612,853

7 Claims. (Cl. 33—174)

This invention relates to means for tracing curves accurately, and is particularly adapted to the describing or measurement of the helical curves and angles in gear teeth and similar objects.

An object of the invention is to provide an improved curve tracing device which will trace curves with extreme accuracy.

Another object is to provide an improved method of measuring three dimensional curves.

Another object is to provide an improved curve tracing device which will be simple in its operation.

Other objects will hereinafter appear.

The invention will be better understood from the description of one practical embodiment thereof illustrated in the accompanying drawings, in which:

Figure 1 is a plan view of an apparatus for measuring the helix angles of the teeth of helical gears;

Figure 2 is a front elevational view thereof; and

Figure 3:
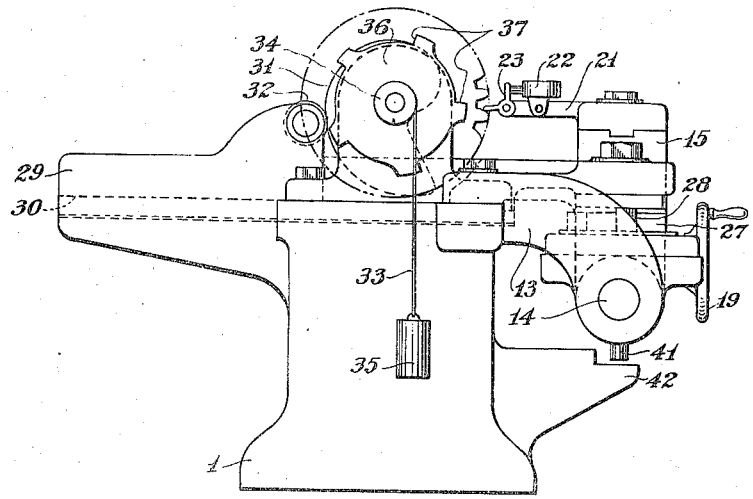
Figure 3 is an end elevation of the left hand end of the apparatus of Figure 2.

The device shown consists of a base 1 upon which are mounted a head stock 2 and a tail stock 3, the former of which is provided with a spindle 4 having a center 5 and the latter of which is provided with a center 6 which is adjusted by means of a hand wheel 7. Between the centers may be mounted an arbor 8, rotatably connected to the spindle by a dog 9 engaging a plate 10, and on this arbor is mounted the gear 11 which it is desired to measure.

It will be apparent that to accurately measure the helix angle, a plurality of readings must be taken at accurately determinable distances axially along the work, and that simultaneously they must be taken at accurately determinable angular distances about the work.

To assure the accurate axial and angular relationship the spindle and, through it, the arbor is rotated and this rotation is caused by the movement of a contacting mechanism axially along the gear.

Extending forwardly from, and secured to, the bed as by screws 12 are two brackets 13 which support a rod 14 which functions as one of a pair of ways for a carriage 15 movable parallel to the axis of the arbor, the carriage extending over and being slidable upon another way 16 upon the upper surface of the base. This carriage can be moved along its ways by a pinion 17 fixed to a shaft 18 journalled in the carriage and operated by a hand wheel 19, the pinion engaging rack teeth 20 cut in the rod.

Supported upon the carriage, as upon adjustable bracket 21, is a dial indicator 22 which may either directly engage one tooth of the gear, but is shown as actuated by a bellcrank lever 23 pivoted upon the bracket.

Adjustable upon the upper surface of the carriage is a plate 24 having arcuate slots 25 near its ends through which pass bolts or screws 26 clamping it to the carriage, to permit its adjustment angularly. The plate has formed thereon an accurately finished straight rib 27, this rib constituting, in effect, a straight cam which may be aptly described as a plate cam or a cam having straight surfaces, and which is engaged by depending follower rollers 28 fixed to a slide 29 movable transversely of the base upon ways 30 formed in its upper surface, and passing beneath the spindle.

Fixed to the spindle is a cam 31 engaged by a roller 32 journalled on the slide, so that the pressure of the roller upon the cam will cause the spindle to rotate as the carriage is reciprocated and the slide moved toward the front of the machine by camming action of the rib on the plate. The cam is maintained in engagement with the roller by means of a belt or cord 33 passing about a sheave-like portion 34 of the spindle, and provided upon its end with a weight 35. When the slide is moved toward the back of the machine or to the left, as viewed in Figure 3, the weight turns the spindle in a clockwise direction as viewed in this figure, to maintain the cam in contact with the roller. The cam is so designed that the ratio of movement between the rotation of the spindle and the translation of the carriage is constant.

It will be apparent that for every amount of axial motion imparted to the carriage, a corresponding amount of rotation is imparted to the spindle, and that the ratio between the two is determined by the angular position of the plate 24, so that if this plate is accurately adjusted to the helix angle desired, the end of bellcrank 23 will trace without fluctuation an accurate helix of the desired angle.

Mounted upon the spindle is an adjusting disc 36 having a plurality of projections the radial faces 37 of which are accurately spaced, and carried by the head stock adjacent this disc is another dial indicator 38 actuated by a contact on one end of the bellcrank lever 39, both indicator and bellcrank being supported upon a bracket 40 pivoted to the head stock. By swinging this indicator in a position to engage the radial surfaces, the angular position of the spindle may be accurately determined.

Upon the lower surface of the carriage is a depending lug 41 overlying a shelf 42 formed upon the base, and secured to the base at the end of this shelf is a third indicator 43, so that the axial position of the carriage may be accurately ascertained by interposing between lug and indicator pieces of known length, such for instance as Johanson blocks.

By means of the disc and its indicator, and the lug and its indicator, it is possible to very accurately position the plate 24 and by means of the first mentioned indicator, once this has been positioned, very minute departures from the desired helix angle may be observed. After the plate has once been adjusted, any number of gears having the same helix angle may be measured without again referring to indicators 38 and 43.

While I have described the illustrated embodiment of my invention in some particularity, obviously many other embodiments will readily occur to those skilled in this art, and I therefore do not limit myself to the precise details shown and described herein, but claim as my invention all embodiments, modifications and variations coming within the scope of the subjoined claims.

I claim:

1. Measuring apparatus comprising a base, a spindle journalled in said base, ways on said base parallel to the axis of said spindle, a carriage slidable upon said ways, transverse ways on said base, a slide movable on said transverse ways, a plate cam adjustably secured to said carriage, a follower upon said slide engaging said cam, a cam upon said spindle, a roller engaging said cam and journalled on said slide, and means maintaining the cam on the spindle in contact with the roller.

2. Measuring apparatus comprising a base, a spindle journalled in said base, ways on said base parallel to the axis of said spindle, a carriage slidable upon said ways, transverse ways on said base, a slide movable on said transverse ways, a plate cam adjustably secured to said carriage, a follower upon said slide engaging said cam, a cam upon said spindle, a roller engaging said cam and journalled on said slide, means maintaining the cam on the spindle in contact with the roller, indicating means interposed between the base and carriage for showing the travel of the carriage, indicating means between the base and spindle showing the rotation of the spindle, and indicating means upon said carriage for engaging an article supported by the spindle.

3. Measuring apparatus comprising a base, a spindle journalled in said base, ways on said base parallel to the axis of said spindle, a carriage slidable upon said ways, transverse ways on said base, a slide movable on said transverse ways, a plate cam adjustably secured to said carriage, a follower upon said slide engaging said cam, a cam upon said spindle, a roller engaging said cam journalled on said slide, means maintaining the cam on the spindle in contact with the roller, a projection on the carriage, an indicator secured to the base arranged to measure the position of said projection, an element having a plurality of radially projecting surfaces secured to said spindle, an indicator adapted to engage any of said surfaces, and a weight tending to move the spindle in a direction to maintain the cam on the spindle in contact with the roller.

4. Measuring apparatus comprising a base, a spindle rotatably carried thereby, a carriage slidable upon said base in the direction of the axis of the spindle, driving means for sliding said carriage on the base, and positive rotating means for the spindle actuated by the movement of the carriage upon the base.

5. Measuring apparatus comprising a base, a spindle rotatably carried thereby, a carriage slidable upon said base in the direction of the axis of the spindle, driving means for sliding said carriage on the base, and positive rotating means for the spindle actuated by the movement of the carriage upon the base comprising a slide, driving connections between the carriage and slide whereby motion of the carriage moves the slide in a direction transverse the spindle, and operative driving connections between said slide and spindle.

6. Measuring apparatus comprising a base, a spindle rotatably carried thereby, a carriage slidable upon said base in the direction of the axis of the spindle, driving means for sliding said carriage on the base, and positive rotative means for the spindle actuated by the movement of the carriage upon the base comprising a slide, driving connections between the carriage and slide whereby motion of the carriage moves the slide in a direction transverse the spindle, a roller carried by the slide, and a cam fixed to the spindle and actuated by said roller.

7. Measuring apparatus comprising a base, a spindle rotatably carried thereby, a carriage slidable upon said base in the direction of the axis of the spindle, driving means for sliding said carriage on the base, and positive rotative means for the spindle actuated by the movement of the carriage upon the base comprising a slide, a plate cam having a straight cam surface and a follower between the carriage and slide whereby motion of the carriage moves the slide in a direction transverse the spindle, a roller carried by the slide, and a rotary cam having a spiral surface fixed to the spindle and actuated by said roller.

CHARLES H. SCHURR.